(12) United States Patent
Gu et al.

(10) Patent No.: US 11,729,823 B2
(45) Date of Patent: Aug. 15, 2023

(54) METHOD AND APPARATUS FOR DETERMINING CHANNEL SENSING THRESHOLD IN UPLINK CHANNEL ACCESS

(71) Applicant: ALCATEL LUCENT, Boulogne-Billancourt (FR)

(72) Inventors: Junrong Gu, Shanghai (CN); Jianguo Liu, Shanghai (CN); Tao Tao, Shanghai (CN); Yan Meng, Shanghai (CN); Sigen Ye, Whitehouse Station, NJ (US); Gang Shen, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/075,342

(22) PCT Filed: Jan. 30, 2017

(86) PCT No.: PCT/IB2017/000199
§ 371 (c)(1),
(2) Date: Aug. 3, 2018

(87) PCT Pub. No.: WO2017/134530
PCT Pub. Date: Aug. 10, 2017

(65) Prior Publication Data
US 2019/0059104 A1 Feb. 21, 2019

(30) Foreign Application Priority Data
Feb. 5, 2016 (CN) .......................... 201610084049.9

(51) Int. Cl.
*H04W 74/08* (2009.01)
*H04W 16/14* (2009.01)
(Continued)

(52) U.S. Cl.
CPC ...... *H04W 74/0808* (2013.01); *H04B 17/102* (2015.01); *H04B 17/104* (2015.01); *H04W 16/14* (2013.01); *H04W 74/006* (2013.01)

(58) Field of Classification Search
CPC ........... H04W 74/0808; H04W 74/006; H04W 16/14; H04B 17/102; H04B 17/104
See application file for complete search history.

(56) References Cited

U.S. PATENT DOCUMENTS 10,004,031 B2   6/2018 Seok
10,462,799 B2 * 10/2019 Wikström ............... H04L 43/16
(Continued)

FOREIGN PATENT DOCUMENTS

| CN | 104488344 A | 4/2015 |
|---|---|---|
| CN | 105265002 A | 1/2016 |
| WO | WO 2015/200133 A1 | 12/2015 |

OTHER PUBLICATIONS

Huawei et al., "Coexistence mechanisms among LAA systems," 3rd Generation Partnership Project (3GPP), 3GPP TSG RAN WG1 Meeting #80, R1-150044, pp. 1-5, XP050933261, Athens, Greece, Feb. 9-13, 2015.

(Continued)

Primary Examiner — Hoang-Chuong Q Vu
(74) Attorney, Agent, or Firm — Lippes Mathias LLP

(57) ABSTRACT

Embodiments of the present disclosure disclose a method and apparatus for determining a channel sensing threshold in uplink channel detection of licensed-assisted access. The method comprises determining one or more parameters associated with the user equipment; and determining a channel sensing threshold for the user equipment based on at least one of the one or more parameters. The threshold determination method may realize suitable threshold deter- (Continued)

mination, flexible channel access, and balance of channel access opportunity among a plurality of radio access points.

11 Claims, 4 Drawing Sheets

(51) Int. Cl.
*H04W 74/00* (2009.01)
*H04B 17/10* (2015.01)

(56) References Cited

U.S. PATENT DOCUMENTS

| | | | |
|---|---|---|---|
| 2002/0059408 A1* | 5/2002 | Pattabhiraman | H04J 3/085 709/223 |
| 2003/0036404 A1* | 2/2003 | Adachi | H01Q 3/2605 455/69 |
| 2005/0181822 A1* | 8/2005 | Sasaki | H04W 88/06 455/552.1 |
| 2013/0188566 A1 | 7/2013 | Zhu et al. | |
| 2013/0229931 A1* | 9/2013 | Kim | H04W 24/10 370/252 |
| 2014/0024357 A1* | 1/2014 | Koskinen | H04W 36/0088 455/418 |
| 2014/0036816 A1* | 2/2014 | Madan | H04W 24/10 370/329 |
| 2014/0226497 A1* | 8/2014 | Ding | H04W 28/0231 370/252 |
| 2015/0046075 A1* | 2/2015 | Neel | H04B 7/26 701/117 |
| 2015/0208441 A1* | 7/2015 | Yoo | H04W 74/0816 370/338 |
| 2015/0382374 A1 | 12/2015 | Bhorkar et al. | |
| 2016/0050674 A1* | 2/2016 | Kenney | H04W 72/08 370/329 |
| 2016/0081010 A1* | 3/2016 | Seok | H04W 74/0816 370/329 |
| 2016/0286499 A1* | 9/2016 | Lim | H04W 52/228 |
| 2017/0086206 A1* | 3/2017 | Wang | H04W 72/085 |
| 2017/0171759 A1* | 6/2017 | Li | H04W 74/0808 |
| 2017/0215082 A1* | 7/2017 | Hwang | H04W 16/14 |
| 2017/0311291 A1* | 10/2017 | Dai | H04W 72/085 |
| 2018/0115970 A1* | 4/2018 | Chae | H04W 72/02 |
| 2018/0132251 A1* | 5/2018 | Sun | H04W 72/06 |
| 2018/0234886 A1* | 8/2018 | Bhorkar | H04W 28/18 |
| 2018/0279365 A1* | 9/2018 | Wang | H04W 52/367 |
| 2018/0376339 A1* | 12/2018 | Hu | H04W 16/14 |

OTHER PUBLICATIONS

Samsung, Discussion on LBT for UL transmission, 3rd Generation Partnership Project (3GPP), 3GPP TSG RAN WG1 Meeting #83, R1-156768, pp. 1-6, XP051003147, Anaheim, USA, Nov. 15-22, 2015.

ZTE, Discussion on the UL LBT for LAA, 3rd Generation Partnership Project (3GPP), 3GPP TSG RAN WG1 Meeting #83, R1-156993, pp. 1-10, XP051003304, Anaheim, USA, Nov. 15-22, 2015.

Huawei et al., "Multicarrier operation for LAA DL," 3rd Generation Partnership Project (3GPP), 3GPP TSG RAN WG1 82 Meeting, R1-154342, pp. 1-6, XP051001661, Beijing, China, Aug. 24-28, 2015.

International Search Report for PCT/IB2017/000199 dated May 31, 2017.

Samsung, "ED threshold adaptation for LAA," 3GPP TSG RAN WG1 Meeting #83, R1-156762, Anaheim, USA, Nov. 15-22, 2015, 5 pp.

Samsung, "Discussion on Category 2 LBT for UL trsansmission," 3GPP TSG RAN WG1 Meeting #82, R1-154138, Aug. 24-28, 2015, pp. 1-5, Beijing, China.

Samsung, "LAA energy detection adaptation," 3GPP TSG RAN WG1 #82bis, R1-155460, Oct. 5-9, 2015, pp. 1-3, Malmo, Sweden.

Huawei, HiSilicon, "Adaptation rules of energy detection threshold," 3GPP TSG RAN WG1 Meeting#82bis, R1-155097, Oct. 5-9, 2015, 3 pages, Malmo, Sweden.

* cited by examiner

METHOD AND APPARATUS FOR DETERMINING CHANNEL SENSING THRESHOLD IN UPLINK CHANNEL ACCESS

FIELD

Embodiments of the present disclosure relate to a method and apparatus for determining a channel sensing threshold in uplink channel access of licensed-assisted access.

BACKGROUND

In 3GPP LTE Rel-13, unlicensed spectrum is used for downlink (DL) transmission in the licensed-assisted access (LAA). Listen-before-talk (LBT) is defined for LAA DL, which requires a base station (the eNB) to perform a channel detection procedure before transmission, and requires it to perform the transmission only if this procedure succeeds. One part of the channel detection procedure is that the eNB needs to do energy detection, and compares the received energy to an energy threshold to determine whether the channel is free for specific time duration. The threshold has significant impact on the channel access opportunity of the eNB, and therefore has significant impact on the coexistence of LAA with other networks such as Wi-Fi, or among LAA nodes.

In LAA DL, a maximum energy detection threshold (hereinafter referred to as threshold) is defined as a function of:

Whether there is another type of RAT (other than LAA);
The transmit power set at the eNB; and
The channel bandwidth In addition, the eNB has the flexibility to use a threshold that is no bigger than the defined maximum energy detection threshold. The specific threshold adaptation mechanism depends on the eNB implementation.

A new work project has been recently approved in Rel-14, which specifies the support to the LAA UL (uplink) transmission. A channel detection procedure of UL transmission will need to be defined for the user equipment (UE), and an energy detection threshold also needs to be defined accordingly for UL transmissions.

Although there are a lot of similarities between DL and UL, there are also some differences between DL and UL, which may require different considerations about how to define the energy detection threshold. It is very important to define a suitable energy threshold, because when an improper threshold is set at an UE, the UE might suffer from either of the following:

(i) If the threshold is too high, there could be strong interference when the data is transmitted. This could result in unsuccessful and inefficient transmission.

(ii) If the threshold is too low, the UE may not be able to transmit due to failure of the channel access. This results in less transmission opportunities and lower LAA performance.

The main differences between DL and UL in the terms of defining the energy detection threshold include:

The presence of another type of RAT, e.g., Wi-Fi, has been taken into account when defining the threshold for DL. However, this may be known to the eNB (e.g. configured/provisioned at the eNB), but not to the UE.

There is UL power control for the UE. Thus typically the UE does not transmit with the maximum transmit power. Especially in a small cell case, the UE rarely uses the maximum transmit power. If the threshold is defined based on the maximum transmit power, it would result in a too conservative threshold and unfavorable impact to the LAA performance.

DL transmission from the eNB typically uses the full bandwidth (especially considering the case that LAA is used for offloading the busy traffic from licensed cells), while UL transmission from a UE may use only part of the system bandwidth.

Multiple UEs can transmit in a same subframe using FDM (frequency division multiplexing) or MU-MIMO (multiple users-multiple inputs and multiple outputs) on UL, while on DL the eNB is the only transmitting node in a cell.

Therefore, it is necessary to provide a method of determining a proper energy detection threshold in UL channel detection procedure of LAA, and the above factors should be taken into account in this method.

SUMMARY

To solve the problems described above, embodiments of the present disclosure propose a method and apparatus for determining a channel sensing threshold in uplink (UL) channel detection of licensed-assisted access (LAA).

An aspect of the present disclosure provides a method for determining a channel sensing threshold in uplink channel detection of licensed-assisted access, this method comprising: determining one or more parameters associated with the user equipment; and determining a channel sensing threshold for the user equipment based on at least one of the one or more parameters.

According to an embodiment of the present disclosure, determining one or more parameters associated with the user equipment comprises determining one or more of the following items associated with the user equipment as said one or more parameters:

(a) channel bandwidth;
(b) transmit power;
(c) whether another type of radio access point (RAT) is present; and
(d) whether a hidden node is present.

According to an embodiment of the present disclosure, determining a channel sensing threshold for the user equipment based on at least one of the one or more parameters comprises at least one of the following: increasing or decreasing the channel sensing threshold based on at least one of the channel bandwidth and the transmit power; or decreasing the channel sensing threshold based on at least one of presence of another type of radio access point and presence of the hidden node.

According to an embodiment of the present disclosure, determining one or more parameters associated with the user equipment comprises: determining said one or more parameters in a first order; and determining the channel sensing threshold using at least one of said one or more parameters determined in the first order.

According to an embodiment of the present disclosure, determining the channel bandwidth associated with the user equipment comprises: determining a channel bandwidth of an entire system; or determining a channel bandwidth allocated and used for burst transmission of the UE.

According to an embodiment of the present disclosure, determining the transmit power associated with the user equipment comprises: determining a maximum transmit power for the UE; determining an expected transmit power of the burst transmission for the UE; or determining an average transmit power in a time period before the burst transmission for the UE.

According to an embodiment of the present disclosure, determining whether other types of RATs associated with the UE are present comprises at least one of: detecting whether another type of RAT associated with the UE is present; and receiving a signaling indicating whether the other type of RAT associated with the UE is present.

According to an embodiment of the present disclosure, determining whether a hidden node associated with the UE is present comprises: receiving a signaling indicating presence of the hidden node detected by a base station; or receiving a signaling indicating presence of a possible hidden node determined by the base station.

According to an embodiment of the present disclosure, the method further comprises: updating one or more parameters associated with the UE in response to reception of a signaling for updating the channel sensing threshold.

Another aspect of the present disclosure provides an apparatus for determining a channel sensing threshold in uplink channel access of licensed-assisted access, the apparatus comprising: a parameter determination module configured to determine one or more parameters associated with the user equipment; and a channel sensing threshold determination module configured to determine a channel sensing threshold for the user equipment based on at least one of the one or more parameters.

According to an embodiment of the present disclosure, the parameter determination module comprises: a channel bandwidth determination unit configured to determine a channel bandwidth associated with the UE; a transmit power determination unit configured to determine a transmit power associated with the UE; a radio access point determination unit configured to determine whether another type of radio access point associated with the UE is present; and a hidden node determination unit configured to determine whether a hidden node associated with the UE is present.

According to an embodiment of the present disclosure, the channel sensing threshold determination module is configured to perform at least one of: increasing or decreasing the channel sensing threshold based on at least one of the channel bandwidth and the transmit power; or decreasing the channel sensing threshold based on at least one of presence of the other type of radio access point and presence of the hidden node.

According to an embodiment of the present disclosure, the parameter determination module is configured to determine said one or more parameters in a first order; and the channel sensing threshold determination module is configured to determine the channel sensing threshold using at least one of said one or more parameters determined in the first order.

According to an embodiment of the present disclosure, the channel bandwidth determination unit comprises: a first bandwidth determination unit configured to determine a channel bandwidth of an entire system; and a second bandwidth determination unit configured to determine a channel bandwidth allocated and used for burst transmission of the UE.

According to an embodiment of the present disclosure, the transmit power determination unit comprises: a first transmit power determination unit configured to determine maximum transmit power for the UE; a second transmit power determination unit configured to determine expected transmit power for the burst transmission of UE; or a third transmit power determination unit configured to determine average transmit power in a time period before the burst transmission for the UE.

According to an embodiment of the present disclosure, the radio access point determination unit comprises: a detection unit configured to detect whether another type of radio access point associated with the UE is present; and a receiving unit configured to receive a signaling indicating whether the other type of radio access point associated with the UE is present.

According to an embodiment of the present disclosure, the hidden node determination unit is configured to: receive a signaling indicating presence of the hidden node detected by a base station; or receive a signaling indicating presence of a possible hidden node determined by the base station.

According to an embodiment of the present disclosure, the apparatus further comprises: a parameter updating means configured to update the one or more parameters associated with the UE in response to reception of a signaling for updating the channel sensing threshold.

The method and apparatus for determining the channel sensing threshold discussed in various embodiments herein have the following advantages:

i) Flexible channel access can be realized. The LAA could avoid the possible hidden node problem and exposed node problem.

ii) The balance of channel access opportunity among multiple RATs can be maintained. (e.g., protection for Wi-Fi transmission).

iii) The efficiency is improved without any other technology of carrier share. A relation between Clear Channel Assessment Energy Detection (CCA ED) threshold and transmit power (other than the maximum transmit power) is established.

BRIEF DESCRIPTION OF THE DRAWINGS

The figures illustrated here are used to provide further understanding of the present disclosure and constitute part of the present application. Exemplary embodiments of the present disclosure and depictions thereof are used to explain the present disclosure and do not constitute improper limitations to the present disclosure.

DETAILED DESCRIPTION OF EMBODIMENTS

Figure 1:
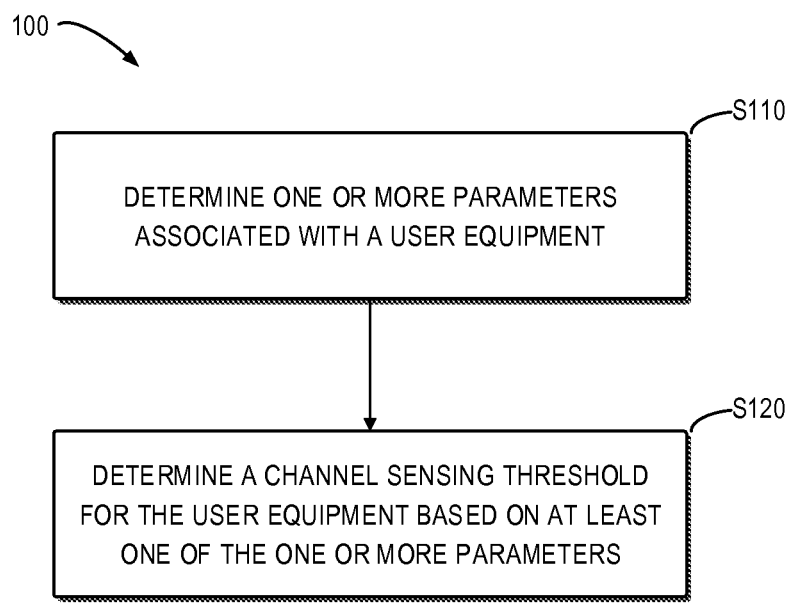
FIG. 1 is a flow chart of a method for determining a channel sensing threshold in uplink channel detection of LAA according to an embodiment of the present disclosure.

Principles of the present disclosure will now be described with reference to various example embodiments illustrated in the drawings. It should be appreciated that description of those embodiments is merely to enable those skilled in the art to better understand and further implement the present disclosure and is not intended for limiting the scope of the present disclosure in any manner.

FIG. 1 is a flow chart of a method 100 for determining a channel sensing threshold in uplink channel detection of LAA according to an embodiment of the present disclosure. The method 100 comprises main steps S110 through S120.

At step S110, one or more parameters associated with the user equipment are determined; and At step S120, a channel sensing threshold for the user equipment is determined based on at least one of the one or more parameters.

According to an embodiment of the present disclosure, determining one or more parameters associated with the user equipment (namely, step S110) may comprise determining one or more of the following items associated with the user equipment as said one or more parameters:

(a) Channel bandwidth;
(b) transmit power;
(c) whether another type of radio access point (RAT) is present; and
(d) whether a hidden node is present.

According to an embodiment of the present disclosure, determining a channel bandwidth associated with the user equipment may comprise determining a channel bandwidth of an entire system.

According to an embodiment of the present disclosure, determining a channel bandwidth associated with the user equipment may comprise determining a channel bandwidth allocated and used for burst transmission of the UE. For example, when the UE uses discontinuous frequency resources for transmission, the channel bandwidth includes only the actual bandwidth that is used by the UE.

According to an embodiment of the present disclosure, determining a channel bandwidth associated with the user equipment may comprise transmitting a signaling from eNB to the UE to inform the UE which type of channel bandwidth as described above should be used for determining channel sending threshold. For example, the eNB can use one bit (e.g. logic value '0') to indicate to use the channel bandwidth of the entire system( ) or use one bit (e.g. logic value '1') to indicate to use the channel bandwidth allocated and used for burst transmission of the UE.

It is noted that the bandwidth described above and used by the UE is for determining the channel sensing threshold. Therefore, the bandwidth described above is not necessarily same as the bandwidth on which the UE actually performs the channel sensing (or energy detection). For example, the UE may perform energy detection on the bandwidth of the entire system, but the threshold described above is calculated based on the actual allocated bandwidth.

According to an embodiment of the present disclosure, determining a transmit power associated with the UE may comprise determining a maximum transmit power for the UE.

According to an embodiment of the present disclosure, determining a transmit power associated with the UE may comprise an expected transmit power of the burst transmission for the UE, wherein the expected transmit power is estimated by the UE based on UL power control and scheduling information before starting the channel detection procedure, and may be updated during the channel detection procedure as required (e.g. based on open loop power control).

It is noted that there may be some difference between the expected transmit power and the actual transmit power when channel detection procedure succeeds, but the difference is expected to be small.

According to an embodiment of the present disclosure, determining a transmit power associated with the UE may comprise determining an average transmit power in a time period before the burst transmission for the UE. For example, the average can be done within a time window or using an infinite impulse response (IIR) filter.

According to an embodiment of the present disclosure, the eNB may send a signaling to the UE to inform which type of transmit power described above should be used at the UE for determining the channel sensing threshold. For example, the eNB can use one-bit (e.g. logic value '0') to indicate to use the maximum transmit power or use one-bit (e.g. logic value '1') to indicate to use the expected transmit power of the burst transmission for the UE.

According to an embodiment of the present disclosure, determining whether other types of RATs associated with the UE are present comprises at least one of: detecting whether another type of RAT associated with the UE is present; and receiving a signaling indicating whether the other type of RAT associated with the UE is present.

According to an embodiment of the present disclosure, the UE may detect whether another type of RAT is present by itself without any assist from the eNB.

According to an embodiment of the present disclosure, the eNB can send a signaling to the UE to indicate whether the UE should assume the presence of other RATs when determining a threshold.

According to an embodiment of the present disclosure, the UE may use a combination of the above to determine whether another type of RAT is present.

According to an embodiment of the present disclosure, determining whether a hidden node associated with the UE is present comprises: receiving a signaling indicating presence of a hidden node detected by a base station. For example, when the eNB detects the hidden node issue for the UL transmission from a particular UE, the eNB can lower the threshold by sending a negative offset to the UE, in order to relieve the hidden node problem. The offset is sent to the UE via UE-specific signaling in this case According to an embodiment of the present disclosure, determining whether a hidden node associated with the UE is present comprises: receiving a signaling indicating whether a possible hidden node associated with the UE and decided by a base station is present. For example, the eNB may decide to use a negative offset by considering (i) the number of UEs being scheduled in a subframe, (ii) the number of user pairs being scheduled using the same time-frequency resource via MU-MIMO, and/or (iii) the estimated transmit power from the UEs. Again for example, the eNB may decide to use a lower threshold, and eNB can send a negative offset signaling to all the UE via broadcast signaling or UE-specific signaling for any other reason (e.g. coexistence with other LAA/Wi-Fi nodes, some specific deployment topology, etc).

It is appreciated that the signaling for different parameters can be transmitted to the UE separately or in a combined fashion. For example, when the eNB needs to signal both the presence of other RATs and a threshold offset for hidden node to UE, the signal can be one of the following ways:

(1) one parameter is used to indicate the presence of a threshold offset, and another parameter is used to signal the threshold offset (2) One threshold offset is used to indicate the combined offset that takes into account both the presence of other RATs and the offset required by hidden node. For example, in the case that the threshold needs to be lower by 10 dB due to presence of Wi-Fi, and an additional 4 dB is required to address the hidden node issue, the eNB can simply signal an offset of 14 dB to the UE.

According to an embodiment of the present disclosure, determining a channel sensing threshold for the user equipment based on at least one of the one or more parameters (namely, step S120) comprises at least one of: increasing or decreasing the channel sensing threshold based on at least one of the channel bandwidth and the transmit power; or decreasing the channel sensing threshold based on at least one of presence of another type of RAT and presence of the hidden node.

According to an embodiment of the present disclosure, the method 100 further comprises an updating step S130 for updating one or more parameters associated with the UE in response to reception of a signaling for updating the channel sensing threshold.

For example, when the threshold needs to be changed/updated, a signaling for changing/updating the threshold may be sent to the UE. For example, whenever there is a change of condition, the eNB sends a semi-static signaling to the UE so that the UE can update the parameters and the channel sensing threshold. This signaling can be delivered to the UE on either licensed or unlicensed carrier.

Alternatively, the necessary parameter(s) such as the threshold offset can be included in downlink control information (DCI) message that carries UL grant. In this case, the UE uses the parameters in this DCI to determine the threshold for the UL transmissions.

Reference is made to a specific example below. This example considers a plurality of parameters stated above and expresses the channel sensing threshold as the following equation (1):

$$T_{max} = -75 \text{ dBm/MHz} + 10 * \log 10(BWMHz) + \alpha(PH - PTX) - Y + \text{Cons} \quad (1)$$

wherein:
BWMHz is the channel bandwidth (MHz);
PH indicates the maximum transmit power of UE, e.g., 23 dBm;
PTX indicates the transmit power of UE withhe noise and channel factors included therein. PTX could be updated per burst or on a larger time scale using the average transmit power;
$\alpha$ is a scale coefficient which scales the impact of the transmit power on the threshold;
$Y = Y1 + Y2$ denotes an offset. $Y1 = 0$, if no other types of RATs are reported, Otherwise, Y1 would be a positive value. Besides, Y is designed against the hidden node problem by Y2. When hidden node problem occurs due to an improper UE threshold, Y2 may be a positive value to further reduce the conflicts by simultaneous transmission.
75 dBm/MHz is with respect to a case of coexistence of the LAA and other RATs and used as a reference value for adjusting the channel sensing threshold;
Cons is a constant.

Referring to the above equation (1), the UE channel sensing threshold would be decided and specified according to the following items:

(i) Channel Bandwidth

As stated above, the channel bandwidth refers to the bandwidth where the UE delivers (or transmit) its data. Actually, the UE may utilize a portion of the whole bandwidth. The channel sensing could be performed on the rated bandwidth, or on a portion of the bandwidth.

Bandwidth is denoted by BWMHz.

Specifically, when there are multiple UEs, one UE may occupy a portion of the system bandwidth in the UL transmission not all of them. Thus, to avoid the interlock among the multiple UEs, the channel sensing bandwidth could be a portion of the system bandwidth. The channel sensing threshold should also adapt to this bandwidth.

On the other hand, the uplink transmission of a UE may spread across the whole bandwidth to satisfy the power spectrum density requirement. Under this case, the BWMHZ should be the whole bandwidth.

(ii) Transmit Power

The UEs may not occupy the whole bandwidth in the UL transmission. Thus, the threshold adjustment shall be based on the transmitting power (density) of UEs and the subcarriers utilized by the UEs. The configuration of the value of $\alpha$ would indicate the impact of the transmitting power of the UE on its threshold.

Besides, the PTX could be flexibly adjusted in different time duration.

Another choice is to select the maximum transmitting power of UEs and neglect the PTX.

(iii) The presence of another type of RAT

When the presence of the other type of RAT is detected, the threshold of the UEs would be kept to, e.g., a lower value ($Y < 0$), so that the UEs could co-exist with them.

If the UE does not have an ability to detect whether other RATs are present, the UE may send a request to the eNB and the eNB could send a signaling to the UE to indicate whether other RATs are present. The presence of another type of RAT could be known to the eNB at deployment stage and configured by operator, however not known to the UE.

If the eNB starts to transmit a signaling to the UE to indicated whether the other type of RAT is present, whereas the UE detects a different results with the signaling. Under this case, the UE could keep a lower threshold, in order to reduce the impact of the other type of RAT.

(iv) Clear Channel Assessment Energy Detection (CCA ED) Threshold Offset

CCA ED threshold offset is configured by eNB, in order to enable flexible channel access (e.g. using a negative value to avoid hidden node problem) at the UE side. When the eNB observes an abnormal state, possibly caused by hidden node, it would suggest the UE to lower down its threshold, in order to avoid the hidden node problem which is reflected by Y2. The eNB may indicate the offset to UE by downlink signaling According to an embodiment of the present disclosure, determining one or more parameters associated with the user equipment (namely, step S110) may further comprise: determining said one or more parameters in a first order; and determining the channel sensing threshold by using at least one of said one or more parameters determined in a first order.

Figure 2:
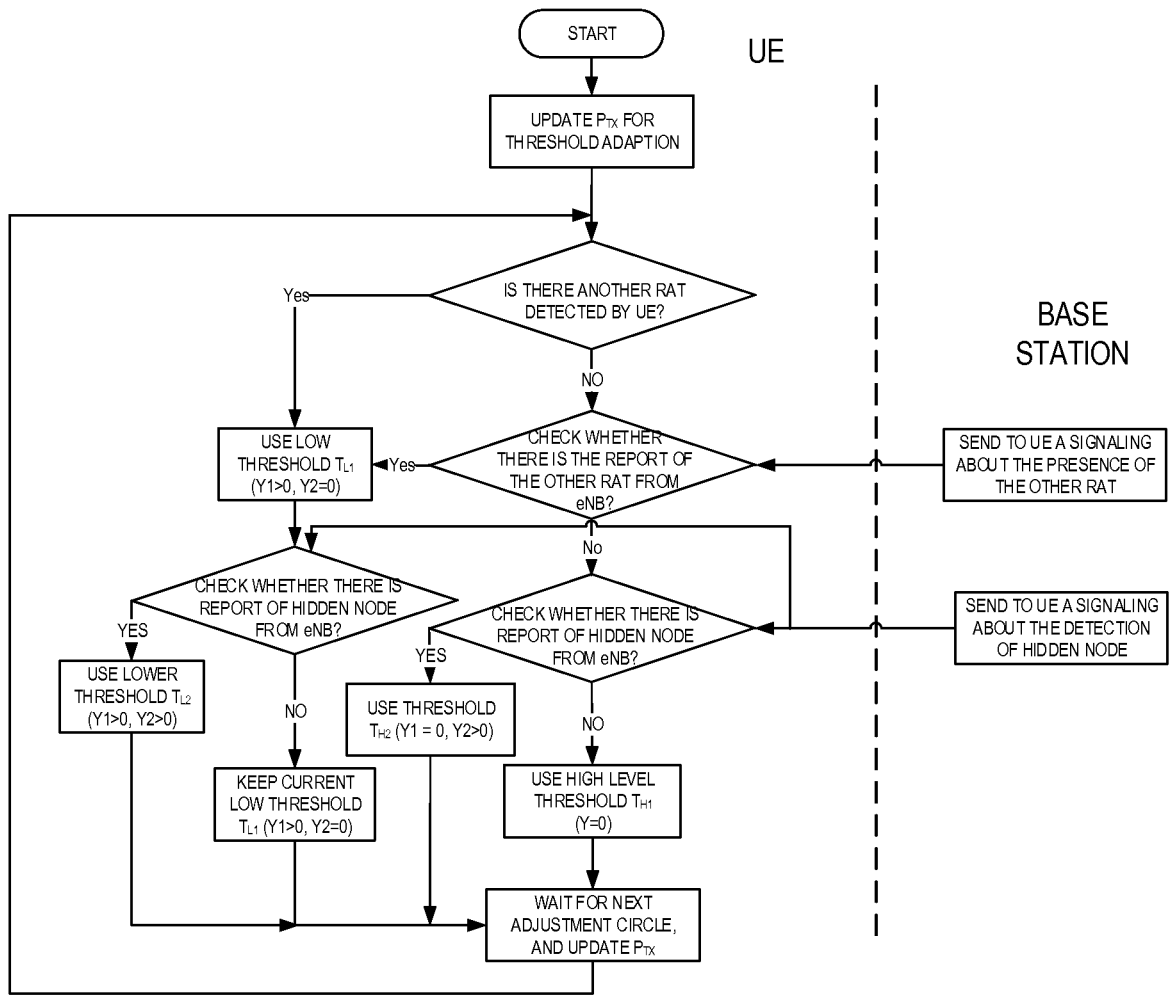
FIG. 2 is a flow chart for adjusting a channel sensing threshold in uplink channel detection of LAA in the case that the UE can detect another type of RAT according to an embodiment of the present disclosure.
Figure 3:
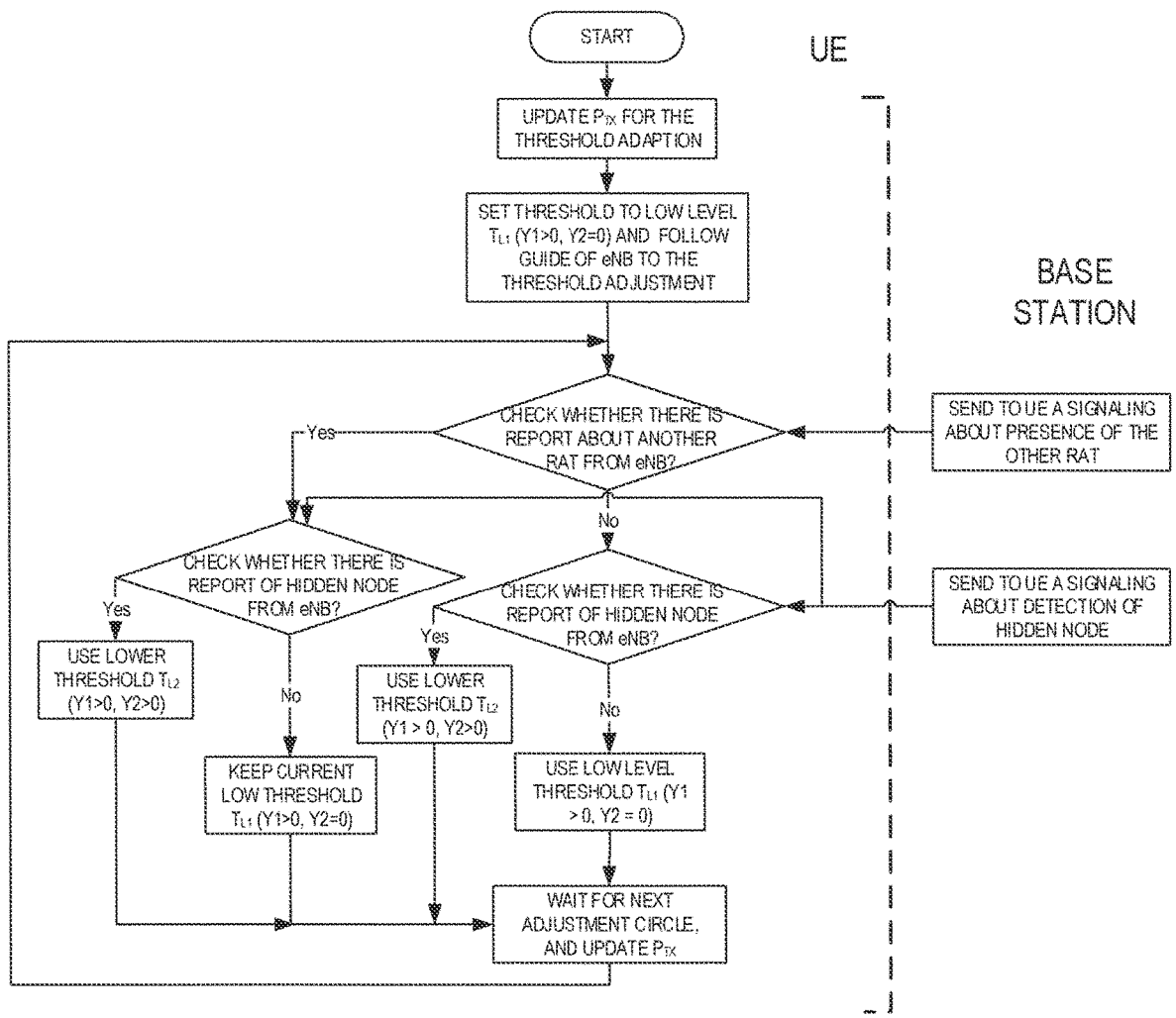
FIG. 3 is a flow chart for adjusting a channel sensing threshold in uplink channel detection of LAA in the case that the UE cannot detect another type of RAT according to an embodiment of the present disclosure.

Reference is made to specific examples in FIG. 2 and FIG. 3 to illustrate parameter determination in a specific order (e.g., a first order) and corresponding threshold adaptation procedure.

FIG. 2 is a flow chart for adjusting a channel sensing threshold in uplink channel detection of LAA in the case that the UE can detect another type of RAT according to an embodiment of the present disclosure.

FIG. 3 is a flow chart for adjusting a channel sensing threshold in uplink channel detection of LAA in the case that the UE cannot detect another type of RAT according to an embodiment of the present disclosure.

For sake of simplicity, in two cases shown in FIG. 2 and FIG. 3, thoughts are only exemplarily given to a two-level threshold for the spectrum sensing of UE. The parameters and variables are set as follows, BWMHz is the full bandwidth;

PTX is transmit power adjusted per burst transmission;
α=1.
Y is zero if no other type of RAT and no hidden nodes are detected. Otherwise, Y is a positive value Based on the above parameters and variables, the threshold could be written as follows if there is no hidden node:

High level (Y1=0, Y2=0):

$$TH1=-75\ dBm/MHz+10*\log 10(BWMHz)+(PH-PTX)+Cons,$$

Low level (Y1>0, Y2=0):

$$TL1=-75\ dBm/MHz+10*\log 10(BWMHz)-Y+(PH-PTX)+Cons.$$

Based on the above parameters and variables, the threshold could be written as follows if there is a hidden node:

High level (Y1=0, Y2>0):

$$TH2=-75\ dBm/MHz+10*\log 10(BWMHz)-Y2+(PH-PTX)+Cons,$$

Low level (Y1>0, Y2>0):

$$TL2=-75\ dBm/MHz+10*\log 10(BWMHz)-Y+(PH-PTX)+Cons.$$

Thoughts are given below to the case in which LAA co-exists with another type of RAT, e.g., Wi-Fi. When UE is able to detect the other type of RATs, the threshold adaption (adjustment) procedures is shown in FIG. 2; the threshold adaption procedure is shown in FIG. 3 when the UE is not able to detect the other type of RAT.

As shown in FIG. 2 (namely, when UE is able to detect the other type of RATs):

First, the UE would update the PTX for the channel sensing threshold of each burst transmission.

Then, the UE would lower the channel sensing threshold to low level (Y1>0, Y2=0) when the other type of RAT is detected. After that, the UE would check the report of hidden node from eNB. If the UE does not detect any other type of RAT, it could go to the next step for checking hidden nodes.

The UE would check the signaling about the hidden nodes from eNB. If currently the threshold is at the low level TL1 (Y1>0, Y2=0) and there is no report of a hidden node, the final threshold is set to be TL1. If currently the threshold is at the low level TL1 (Y1>0, Y2=0) and there is report of a hidden node, the final threshold is set to be lower level TL2 (Y1>0, Y2>0). If currently the threshold is at the high level TH1 (Y1=0, Y2=0) and there is no report of a hidden node, the final threshold is set to be TH1. If currently the threshold is at the high level TH1 (Y1=0, Y2=0) and there is report of a hidden node, the final threshold is set to be high level TH2 (Y1=0, Y2>0).

In the next adaption circle, the transmitting power would be updated and the threshold would be updated again.

As shown in FIG. 3 (namely, when UE cannot be able to detect the other type of RAT), First, the UE would update the PTX for the channel sensing threshold of each burst transmission.

since the UE cannot be able to detect the other type of RAT, the threshold is kept at lower level. In the meantime, the UE would follow the guide of eNB.

The eNB would send a signaling to the UE to indicate whether there are the other type of RATs. Since the UE threshold is already at lower level TL1 (Y1>0, Y2=0), the UE would not change the threshold. This policy is mainly for protecting the other type of RAT and reducing the impact to them.

Next, the UE would check the eNB's report about the hidden node. If there is no report of the hidden node, the final threshold is set to be TL2 (Y1>0, Y2=0), Otherwise, the final threshold is set to be TL2 (Y1>0, Y2>0).

In the next adaption circle, the transmitting power would be updated and the threshold would be updated again.

It is noted that it is not always necessary to present all steps in FIGS. 2 and 3 as discussed above. It is also not necessary to follow the exact order presented in the flow shown in FIG. 2 and FIG. 3. The involved steps and execution order are only exemplary and not restrictive. Those skilled in the art may appreciate that threshold adjustment procedures involving more or fewer parameters and additional parameters should also fall within the scope of the present disclosure.

Figure 4:
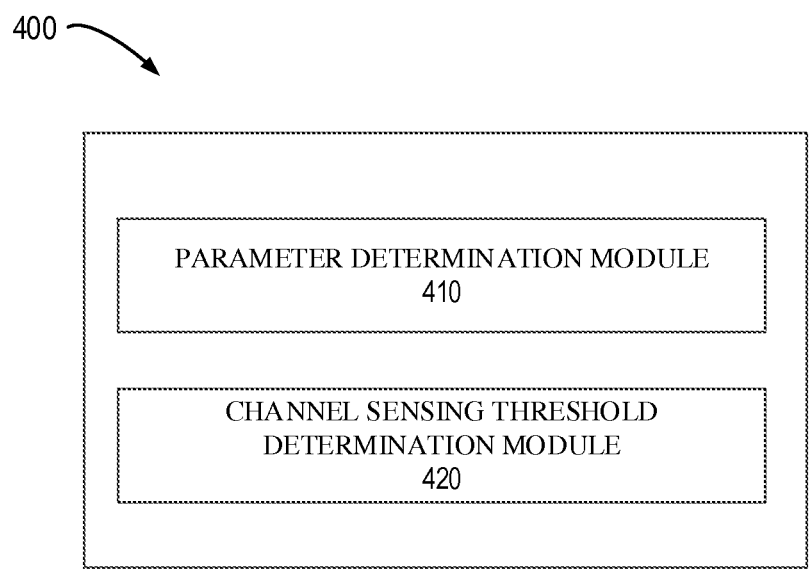
FIG. 4 is a block diagram of an apparatus for determining a channel sensing threshold in uplink channel detection of LAA according to an embodiment of the present disclosure.

FIG. 4 is a block diagram of an apparatus 400 of determining a channel sensing threshold in uplink channel detection of LAA according to an embodiment of the present disclosure. The apparatus 400 comprises: a parameter determination module 410 configured to determine one or more parameters associated with the user equipment; and a channel sensing threshold determination module 420 configured to determine a channel sensing threshold for the user equipment based on at least one of the one or more parameters.

According to an embodiment of the present disclosure, the parameter determination module 410 comprises: a channel bandwidth determination unit configured to determine a channel bandwidth associated with the UE; a transmit power determination unit configured to determine a transmit power associated with the UE; a radio access point determination unit configured to determine whether another type of radio access point associated with the UE is present; and a hidden node determination unit configured to determine whether a hidden node associated with the UE is present.

According to an embodiment of the present disclosure, the channel sensing threshold determination module 420 is configured to perform at least one of: increasing or decreasing the channel sensing threshold based on at least one of the channel bandwidth and the transmit power; or decreasing the channel sensing threshold through at least one of presence of another type of radio access point and presence of the hidden node.

According to an embodiment of the present disclosure, wherein the parameter determination module 410 is configured to: determine said one or more parameters in a first order; and determine the channel sensing threshold using at least one of said one or more parameters determined in the first order.

According to an embodiment of the present disclosure, the channel bandwidth determination unit comprises: a first bandwidth determination unit configured to determine channel bandwidth of the entire system; and a second bandwidth determination unit configured to determine channel bandwidth allocated and used for burst transmission of the UE.

According to an embodiment of the present disclosure, the transmit power determination unit comprises: a first transmit power determination unit configured to determine a maximum transmit power for the UE; a second transmit power determination unit configured to determine an expected transmit power for burst transmission of the UE; or a third transmit power determination unit configured to determine an average transmit power in a time period before the burst transmission of the UE.

According to an embodiment of the present disclosure, the radio access point determination unit comprises: a detection unit configured to detect whether another type of radio access points associated with the UE are present; and a receiving unit configured to receive a signaling indicating whether the other type of radio access point associated with the UE is present.

According to an embodiment of the present disclosure, the hidden node determination unit is configured to: receive a signaling indicating presence of the hidden node detected by a base station; or receive a signaling indicating presence of a possible hidden node determined by the base station.

According to an embodiment of the present disclosure, the apparatus 400 further comprises: a parameter updating means configured to update the one or more parameters associated with the UE in response to reception of a signaling for updating the channel sensing threshold.

What described above is only optional embodiments of the present disclosure and not intended to limit the present disclosure. Those skilled in the art appreciate that the present disclosure may have various modifications and variations. Any modifications, equivalents and improvements within the spirit and principle of the present disclosure should all fall within the protection scope of the present disclosure.

We claim:

1. A method of determining a channel sensing threshold in uplink channel access of licensed-assisted access, comprising:
   determining parameters associated with user equipment; and
   determining the channel sensing threshold for the user equipment based on the parameters, wherein said determined channel sensing threshold is employed for uplink channel access of licensed-assisted access;
   wherein the determining parameters associated with the user equipment includes determining the following items associated with the user equipment as the parameters:
   (a) channel bandwidth;
   (b) a transmit power; and
   (c) whether another type of radio access point is present;
   wherein determining the channel sensing threshold for the user equipment based on the parameters comprises:
   increasing or decreasing the channel sensing threshold based on the channel bandwidth and the transmit power; and
   decreasing the channel sensing threshold based on a presence of the other type of radio access point.

2. The method according to claim 1, wherein determining the one or more parameters associated with the user equipment comprises determining the channel bandwidth associated with the user equipment by:
   determining channel bandwidth of an entire system; or
   determining channel bandwidth allocated and used for burst transmission of the user equipment.

3. The method according to claim 1, wherein determining the parameters associated with the user equipment comprises determining the transmit power associated with the user equipment by:
   determining a maximum transmit power for the user equipment;
   determining an expected transmit power for burst transmission of the user equipment; or
   determining an average transmit power in a time period before the burst transmission of the user equipment.

4. The method according to claim 1, wherein determining the parameters associated with the user equipment comprises determining whether the other type of radio access point associated with the user equipment is present by:
   detecting whether the other type of radio access point associated with the user equipment is present; and
   receiving a signaling indicating whether the other type of radio access point associated with the user equipment is present.

5. The method according to claim 1, wherein determining the parameters associated with the user equipment comprises determining whether a hidden node associated with the user equipment is present by:
   receiving a signaling indicating presence of the hidden node detected by a base station; or
   receiving a signaling indicating presence of the hidden node determined by the base station.

6. An apparatus for determining a channel sensing threshold in uplink channel access of licensed-assisted access, comprising:
   a processor; and
   a memory including computer program code;
   the memory and the computer program code configured to, with the processor, cause the apparatus to at least perform:
   determining parameters associated with user equipment, including determining the following items associated with the user equipment as the parameters:
   (a) channel bandwidth;
   (b) a transmit power; and
   (c) whether another type of radio access point is present;
   determining the channel sensing threshold for the user equipment based on the parameters, wherein said determined channel sensing threshold is employed for uplink channel access of licensed-assisted access;
   increasing or decreasing the channel sensing threshold based on the channel bandwidth and the transmit power; and
   decreasing the channel sensing threshold based on a presence of the other type of radio access point.

7. The apparatus according to claim 6, wherein
   the parameter determination module is configured to determine the parameters in a first order; and
   the channel sensing threshold determination module is configured to determine the channel sensing threshold using the parameters determined in the first order.

8. The apparatus according to claim 6, wherein the channel bandwidth determination unit comprises:
   a first bandwidth determination unit configured to determine channel bandwidth of an entire system; and
   a second bandwidth determination unit configured to determine channel bandwidth allocated and used for burst transmission of the user equipment.

9. The apparatus according to claim 6, wherein the transmit power determination unit comprises:
   a first transmit power determination unit configured to determine a maximum transmit power for the user equipment;
   a second transmit power determination unit configured to determine an expected transmit power for burst transmission of the user equipment; or
   a third transmit power determination unit configured to determine an average transmit power in a time period before the burst transmission of the user equipment.

10. The apparatus according to claim 6, wherein the radio access point determination unit comprises:
    a detection unit configured to detect whether the other type of radio access point associated with the user equipment is present; and a receiving unit configured to receive a signaling indicating whether the other type of radio access point associated with the user equipment is present.

11. The apparatus according to claim 6, wherein a hidden node determination unit is configured to:
receive a signaling indicating presence of a hidden node detected by a base station; or
receive a signaling indicating presence of the hidden node determined by the base station.

\* \* \* \* \*